United States Patent [19]

Kenbo

[11] Patent Number: 4,996,650
[45] Date of Patent: Feb. 26, 1991

[54] PRINT CONTROL SYSTEM

[75] Inventor: Nobumitsu Kenbo, Hadano, Japan

[73] Assignee: Hitachi Ltd., Tokyo, Japan

[21] Appl. No.: 397,198

[22] Filed: Aug. 23, 1989

[30] Foreign Application Priority Data

Sep. 12, 1988 [JP] Japan .................. 63-227687

[51] Int. Cl.$^5$ .......................................... G06K 15/00
[52] U.S. Cl. .................................. 364/519; 364/900
[58] Field of Search ............................ 364/518–523, 364/235 MS, 930 MS; 346/154

[56] References Cited

U.S. PATENT DOCUMENTS 4,716,533 12/1987 Ohmori .............................. 364/518

FOREIGN PATENT DOCUMENTS 61-105638 5/1986 Japan ................................. 364/518
60-98119 12/1986 Japan ................................. 364/518
61-53195 9/1987 Japan .................................. 364/518

*Primary Examiner*—Arthur G. Evans
*Attorney, Agent, or Firm*—Antonelli, Terry, Stout & Kraus

[57] ABSTRACT

A pivot control system in which an object to be printed is developed in the form of dots on a full-dot memory having an area corresponding to a maximum size of printing paper to provide data in the form of dots, and in which the data read out in a serial form from the full-dot memory are transmitted to a printing section, allowing thereby the data to be printed on different sizes of printing paper. The system has a device for discriminating data read out from the full-dot memory which discriminates the data whose position is within an effective printing area set according to the size of the printing paper. The data read out from the memory and discriminated by the device is inhibited from being transmitted to the printing section.

12 Claims, 2 Drawing Sheets

PRINT CONTROL SYSTEM

BACKGROUND OF THE INVENTION a. Field of the Invention

This invention relates to a print control system for use with a printer, and more particularly to a print control system which is capable of adapting printing by the printer to different sizes of printing paper.

b. Background Art

The most common print control system heretofore employed for a printing unit such as a laser beam printer or the like operates in such a manner that character or graphic data supplied thereto from a host unit are once developed in the form of dots on a frame memory such as a so-called full-dot memory (or bit-map memory), and then printing is carried out according to the contents of the full-dot memory. This system, however, should be adapted for a variable effective printing area which varies with the size of the printing paper.

A first possible idea to adapt for such variation of the effective printing area is such that a full-dot memory having a memory area corresponding to the maximum size of the printing paper is prepared and each data to be written into the full-dot memory is subjected to a determination, prior to writing, as to whether or not the data will be within the effective printing area so that only the data within the effective printing area may be written in the full-dot memory when it is required to print out the data on printing paper smaller than the maximum size. This method, however, is detrimental in that it needs a determination operation for each data as to whether or not it will be within the effective printing area and this determination operation requires a amount of considerable time. For this reason, the following method is considered more practical.

According to this method, a full-dot memory having a memory area corresponding to the maximum size of printing paper is preliminarily provided as in the first method mentioned above. This second method, however, differs from the first method in that data are written into the memory without considering the effective printing area. When printing is to be made on the printing paper smaller than the maximum size, unnecessary data, which will be located outside the effective printing area, are deleted or cancelled by microprogram control prior to the printing.

Various data processing techniques related to the method are disclosed, for example, in Japanese Publications of Unexamined Patent Applications (KOKAI) No. 62-210534, No. 61-256431 and No. 61-105638.

The second method, however, needs a data deletion operation to eliminate before printing the data developed on the memory but located outside the effective printing area of the printing paper. This deletion operation again requires a considerable amount of time and lowers the performance of the entire print control system.

SUMMARY OF THE INVENTION

It is therefore an object of the present invention to provide a print control system which allows data developed on a full-dot memory to be printed on any desired size of printing paper without data deletion operation, thereby improving the performance of the entire print control system.

The present invention is applied to a print control system in which an object to be printed is developed in the form of dots on a full-dot memory having an area corresponding to a maximum size of printing paper to provide data in the form of dots and the data read out in a serial form from the full-dot memory are transmitted to a printing section, allowing the data to be printed on different sizes of printing paper. The word "print" is used here to mean the formation or recording of a latent image of an original on a photosensitive drum as well as a print out on a sheet of paper.

The print control system according to the present invention comprises means for discriminating data read out from the full-dot memory as to whether or not the position of the data being printed is within an effective printing area set according to the size of the printing paper. It further comprises means for inhibiting the read out data from being transmitted to the printing section if the position is out of the effective printing area.

The printing section effects printing preferably by raster scanning with a beam, according to the data read out from the full-dot memory in serial form. The discriminating means determines whether or not the printing position is within the effective printing area based on the scanning position of the beam to discriminate the data within the effective printing area from the data outside the area.

The discriminating means comprises, for example, a horizontal effective-printing-range discriminating section which counts dot reading clocks for each raster line and compares the count value with a target value set according to a size of the printing paper to effect the determination as to whether the printing position is within the effective printing area or not and a vertical effective-printing-range discriminating section which counts raster lines and compares the count value with a target value set according to the size of the printing paper to effect the determination as to whether the printing position is within the effective printing area or not.

In this case, a gate means is provided for either enabling the read out data to pass therethrough or disabling such data from passing therethrough, depending on an output from the horizontal effective-printing-range discriminating section and an output from the vertical effective-printing-range discriminating section. Alternatively, a gate means may be provided for enabling the read out data to pass therethrough or disabling such data from passing therethrough depending on an output from the horizontal effective-printing-range discriminating section, in combination with means for stopping or terminating the reading out of the data from the full-dot memory depending on an output from the vertical effective-printing-area discriminating section.

Referring to FIG. 1, the principle of the present invention will now be described in comparison with that of the prior art.

A full-dot memory (also referred to simply as FDM) has a memory area of a size corresponding to the maximum size of printing paper. Data is written into FDM without considering an effective printing area 104 of the printing paper or without discriminating data which be located outside of the effective printing area. The data to be written into FDM are received from a host unit and they contain characters 101, graphics 102, a format (rules, etc.) 103 or the like.

According to the prior art method, the data to be left out of the effective printing area are then deleted.

Thereafter, the contents of FDM 2 are read out and transmitted to a printing section as printing data to be printed on paper 106 as shown by a route (b) in FIG. 1.

According to the present invention, in contrast, the contents of FDM 1 are read out and directly transmitted to the printing section without being subjected to the data deletion processing, as shown by a route (a).

This route (a), on the other hand, includes an effective-printing-area discrimination means 105. This means discriminates each printing data by determining whether the data will be located within the effective printing area or not. Only the data which are determined to be within the effective printing area are allowed to pass to the printing section, while the data determined to be outside the effective printing area are inhibited to pass. These data determination and data inhibition operations are carried out substantially in synchronism with the data reading from FDM and do not substantially lower the data processing speed.

The print control system of the present invention is applicable to a printer of the type in which printing is made by raster scanning, such as a laser beam printer or an ink jet printer. The scanning positions of the recording beam relative to the printing paper in the horizontal and the vertical direction are detected for determination of the effecting printing area.

In the laser printer, for example, scanning is made in the horizontal direction from left to right and feeding in the vertical direction is attained by rotation of a photoconductive drum. The horizontal position of the laser beam is detected by counting the number of dot clocks which correspond to printing dots. The vertical position of the laser beam is detected by counting the number of laser beam scanning lines or raster lines. Thus, the scanning position of the laser beam is detected in real time. The scanning position thus detected is compared with a constant determined by the size of the printing paper to determine whether the current scanning position is within the effective printing area or not. The printing data corresponding to the scanning positions as determined to be outside the effective printing area are discriminated and the data transmission to the printing section is inhibited. As a result of this, no printing is effected on the printing paper for the data out of the effective printing area, even though the data out of the effective printing area have been read out.

As mentioned above, the present invention does not need an operation for deleting the printing data prior to printing, even if the size of the paper changes. Therefore, the data processing time for printing is shortened and the performance of the print control system is improved.

The present invention is especially advantageous when the same image is to be printed on a larger size of printing paper after it has been printed on a smaller size of paper. In this case, the operation of developing the data on the full-dot memory for printing it on the larger paper may be omitted.

DESCRIPTION OF EMBODIMENTS

Figure 4:
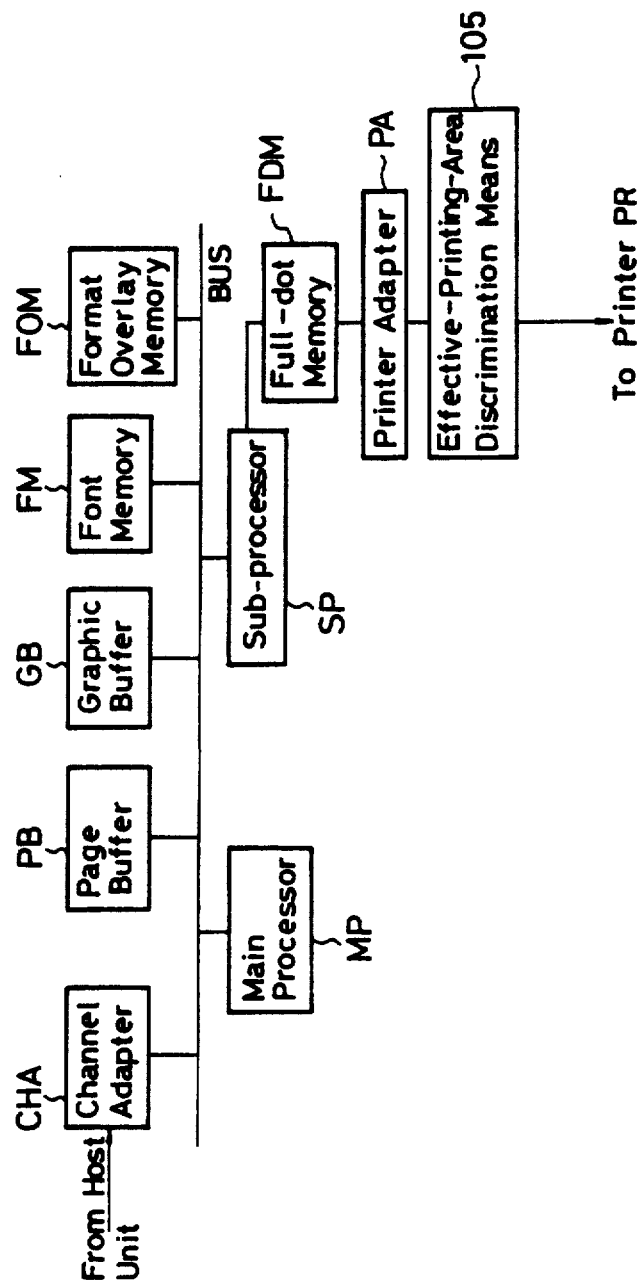
FIG. 4 is a block diagram of a print control system to which the present invention is applied.

FIG. 4 illustrates, in the form of a block diagram, a print control system according to the present invention.

The print control system illustrated in FIG. 4 comprises a channel adapter CHA, a main processor MP, a subprocessor SP, a page buffer PB, a graphic buffer GB, a font memory FM, a format overlay memory FOM, a full-dot memory FDM, a printer adapter PA, and an effective-printing-area discrimination circuit 105.

An operation of the print control system of FIG. 4 will now be described. Character data from a host unit are transmitted through the channel adapter CHA to the main processor to be subjected to editing processing there. The so processed data are stored in the page buffer PB. Similarly, graphic data and image data are stored in the graphic buffer GB. Format overlay data are stored in the format overlay memory FOM similarly. When data for one complete coverage of a page are stored in the respective memories, then the processing reins are transferred to the sub-processor SP. The sub-processor SP reads the character data out of the page buffer PB and develops them into character patterns, while referring to the contents of the font memory. Then it writes the character data into the full-dot memory FDM. As to the graphic, image or format data, the sub-processor SP processes the data stored in the respective memories and writes the processed data in the full-dot memory FDM.

After the writing operation to the full-dot memory as mentioned above has completed, the printer adapter PA reads the data out of the full-dot memory FDM and converts the data into a serial form (parallel-to-serial conversion) to transmit them to a printing section or a printer PR (not shown). At this time, the printing data which will be located out of the effective printing area are inhibited from being sent to the printing section by the effective-printing-area discrimination circuit 105.

Figure 1:
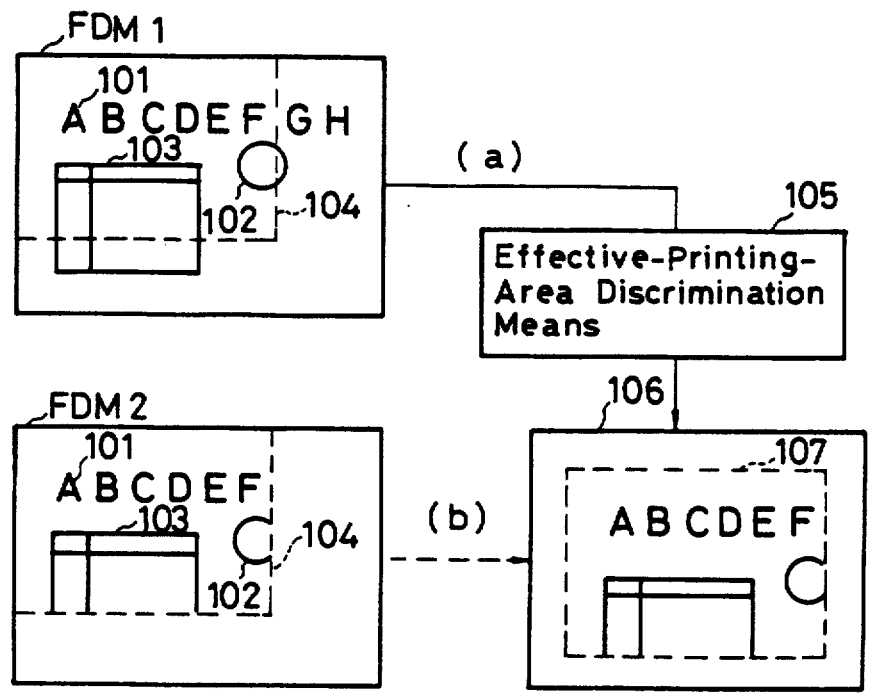
FIG. 1 is an explanatory view illustrating a principle of the present invention in comparison with that of the prior art.
Figure 2:
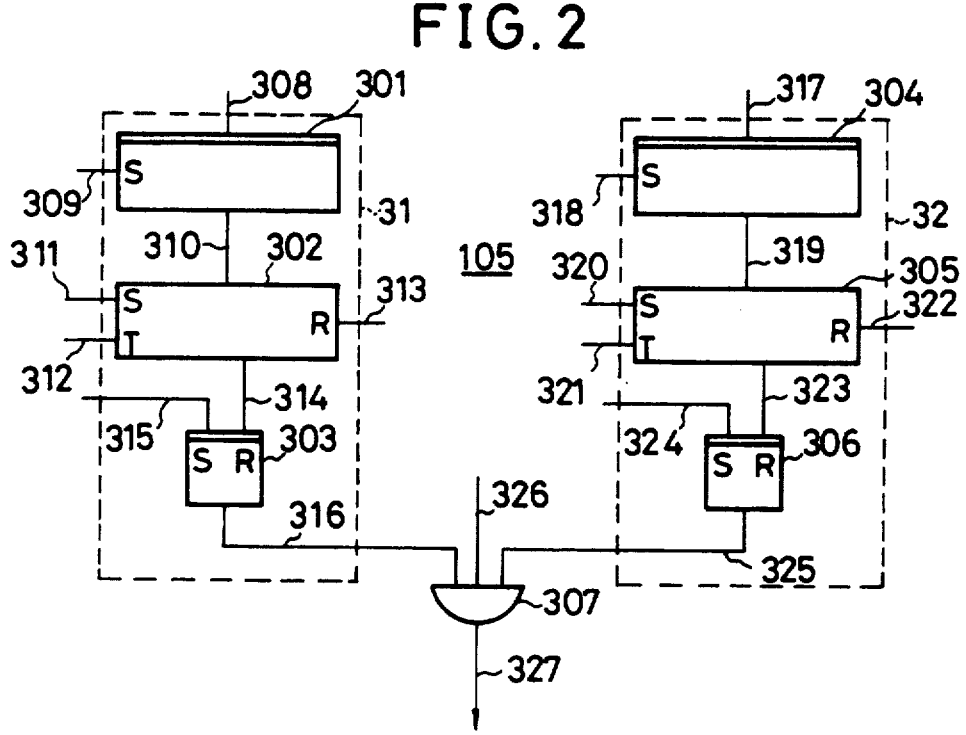
FIG. 2 is a specific form of an effective-printing-area discrimination circuit.

FIG. 2 illustrates a specific form of the effective-printing-area discrimination circuit 105 of FIG. 4.

The circuit of FIG. 2 comprises a lateral (horizontal) effective-printing-range discriminating section 31 which detects a beam scanning position in the horizontal direction to discriminate the scanning position in relation with the effective printing range in the horizontal direction and a longitudinal (vertical) effective-printing-range discriminating section 32 which detects a beam position in the vertical direction to discriminate the scanning position in relation with the effective printing range in the vertical direction. It further comprises an AND gate 307 which allows the data read out in a serial form from the full-dot memory FDM to pass therethrough or inhibits them to pass therethrough according to the discrimination results of the discriminating sections 31 and 32.

The horizontal effective-printing-range discriminating section 31 comprises a register 301, a counter (down counter) 302 and a one-bit register 303, while the vertical effective-printing-range discriminating section 32 comprises a register 304, a counter (down counter) 305 and a one-bit register 306.

In the horizontal effective-printing-range discriminating section 31, the number of dots included in the horizontal effective printing area is held in the register 301 in response to a set signal 309. Since the value of the dot number is fixed so long as the paper size has not changed, it suffices to set the value at the beginning of each page. The dot number 308 and the set signal 309 are subjected to microprogram control in the embodiment as illustrated. The content of the register 301 is transferred to the down counter 302 in response to the set signal 311 which is outputted whenever new raster line by beam scanning starts. A decrement trigger 312 synchronized with a dot clock for the data read out from the full-dot memory FDM is applied to the down counter 302. The counter 312 decreases one count by every decrement trigger 312 applied thereto. The one-bit register 303 is set by an effective-printing-range starting signal 315 indicative that the beam scanning has entered the effective printing range. A left extremity of the effective printing area is fixed irrespective of a size of the printing paper on which the printing is to be made. The starting signal, therefore, can be produced easily. The beam scanning proceeds until the count value of the counter 302 reaches "0", when the counter 302 outputs a signal 314 to reset the one-bit register 303. Thus, the signal 316 is effective (high in the embodiment as illustrated) during a period of time in which the horizontal beam scanning position is within the effective printing range.

The vertical effective-printing-range discriminating section 32, on the other hand, operates as follows. The number of raster lines to be included within the vertical effective printing range is held in the register 304 in response to a set signal 318. The setting of the raster number may be made at the beginning of each page as in the horizontal effective-printing-range discriminating section 31. This setting is also carried out by microprogram control. The set value of the register 304 is transferred to the counter 305 in response to the set signal 320 outputted whenever printing starts in each page. The set value of the counter 305 is decremented in response to a decrement trigger 321 outputted upon every starting of scanning. The one-bit register 306 is set by a vertical effective-printing-range starting signal 324 and it is reset when the count value of the counter 305 reaches "0". An upper extremity of the vertical effective printing range is fixed irrespective of the paper size, the starting signal 324 can also be obtained easily. The signal 323 remains effective (high in this embodiment) during a period of time in which the vertical beam scanning position is within the effective printing range.

Thus, only during a period of time in which both the horizontal and vertical beam scanning positions are within the respective effective printing ranges, the AND gate 327 opens to enable the serial data 326 from the full-dot memory FDM to pass therethrough. At any other time, the gate is closed to disable the data to pass therethrough. An output from the AND gate 307 is transmitted to the printing section as printing data 327. Signals 313 and 322 may be applied to the counters 302 and 305, respectively to forcibly cause the counters to produce the reset signals 314 and 322 at any desired time for resetting the one-bit registers 303 and 306, respectively.

Figure 3:
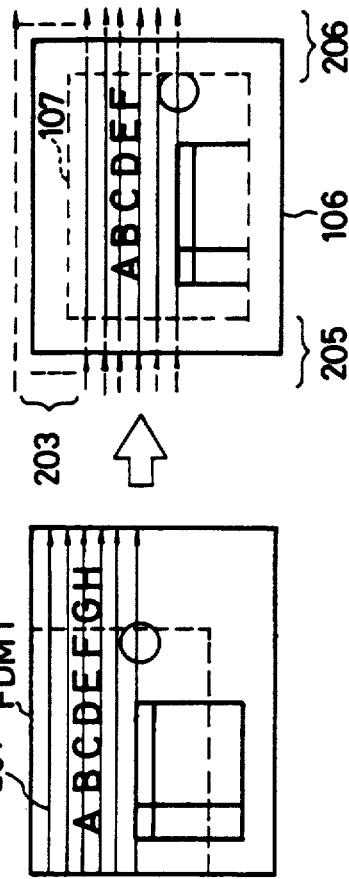
FIG. 3 is an explanatory view illustrating an operation of the effective-printing-area discrimination circuit shown in FIG. 2.

Referring now to FIG. 3, an operation of the circuit shown in FIG. 2 which is applied to the laser beam printer will be described. FIG. 3 specifically illustrates an operation of reading data out from the full-dot memory FDM and an operation of printing on the printing paper (actually, recording on a photo-conductive drum by laser beam) according to the present invention.

Normally, laser beam scanning is carried out in a horizontal direction. It is now assumed that the numbers of dots and raster lines to be included within the effective printing area of the printing paper are set in the registers 301 and 304, respectively. At the time of initiation of printing on each page, the signal 320 is outputted and the value set in the register 304 is transferred to the counter 305 and set as an initial value therein. The signal 311 is produced at the time of initiation of each line of laser beam scanning and the value set in the register 301 is transferred to the the counter 302 as an initial value.

The reading out from the full-dot memory FDM is not carried out when the beam is scanning an upper margin 203 or a left margin 205 of the effective printing area 107 of printing paper 106. When the beam reaches the effective printing area 107, reading out of the data starts and it is carried out along a horizontal line 201 of the full-dot memory FDM in response to the signals 315 and 324. At the same time, the one-bit registers 303 and 306 are set by the signals 315 and 324. As a result of this, the AND gate 307 is opened to enable the serial data from the full-dot memory FDM to pass therethrough.

The data on the horizontal line 201 of the full-dot memory FDM are all read out irrespective of the size of the effective printing area 107 on the printing paper. On the other hand, reading of the data from the full-dot memory itself may be stopped or terminated as soon as the subprocessor begins to read out the data located outside the effective printing area from the full-dot memory FDM. This method, however, renders the logic complicated to solve problems such as a difficulty in detecting the initiation of the data reading outside the effective printing range or a difficulty encountered when the end or boundary of the effective printing area is positioned in the midst of one word. For this reason, this method is not employed in the present invention.

During the reading of the data along the horizontal line 201, the set value of the counter 302 is decremented in synchronism with the data reading clock. When the horizontal scanning of the laser beam reaches the right extremity of the effective printing area 107, the value of the counter 302 becomes "0" and the one-bit register 303 is reset. At that time, the AND gate which has been open is rendered closed to disable the serial data 326 read out from the full-dot memory FDM to pass therethrough. Consequently, printing is not effected any more even if the printing data are read out from the full-dot memory FDM by laser beam scanning over the right margin 206 of the effective printing area 107.

When the laser beam starts further line of scanning, the signal 311 is outputted again to set the initial value in the counter 302. When the laser beam scanning reaches the left extremity of the effective printing area 107, the one-bit register 315 is set and the data on the next line of the full-dot memory FDM begins to be read out. At the same time, the value of the counter 302 is decremented in synchronism with the data reading clock. Since the one-bit register 303 remains set during this further line of raster scanning, the data 326 read out from the full-dot memory FDM are allowed to pass through the AND gate 307 during a period from the time when the one-bit register 303 is set through the time when it is reset.

The reading out of the data along the lines of the full-dot memory FDM is repeated in the manner as mentioned above until the laser beam scanning reaches the lower extremity of the effective printing area of the paper. In other words, the counter 305 repeats decrement upon every raster or scanning line until it reaches "0", when the one-bit register 306 is reset. The data read out from the full-dot memory FDM thereafter are inhibited from passing through the AND gate 307.

In this connection, it is to be noted that print control in the vertical direction may alternatively be carried out in such a manner that the reading out of the data from the full-dot memory FDM itself is stopped or terminated by an output from the vertical effective-printing-area discriminating section 32. In this case, there is no need to input the output from the vertical effective-printing-area discriminating section 32 to the AND gate 307.

In the embodiment as illustrated, the set values of the respective registers 301 and 304 may be changed to adapt for a change of the sizes of the printing paper.

While only a preferred embodiment of the invention has been illustrated and described in detail, it is particularly understood that various changes or modifications can be made within the spirit of the present invention. For example, an up counter may be used instead of the down counter used in the embodiment as illustrated. In this case, the initial value is set as "0" and the counter increases one count at a time to reach a preliminarily determined value.

I claim:

1. A print control system in which an object to be printed is developed in the form of dots on a full-dot memory having an area corresponding to a maximum size of printing paper to provide data in the form of dots and the data read out in a serial form from the full-dot memory are transmitted to a printing section, allowing the data to be printed on different size of printing paper, comprising:
    means for discriminating data read out from the full-dot memory by determining whether the position of the data being printed is within an effective printing area set according to the size of the printing paper or not; and
    means for inhibiting the read out data from being transmitted to the printing section whose position is determined as being out of the effective printing area.

2. A print control system as claimed in claim 1, wherein said printing section effects printing by raster scanning with a beam according to the data read out from the full-dot memory in a serial form and said means for discriminating data makes determination as to whether said position is within the effective printing area or not based on the scanning position of the beam.

3. A print control system as claimed in claim 2, wherein said means for discriminating data comprises a horizontal effective-printing-range discriminating section which counts clocks for reading dots for each raster line and compares the count value with a target value set according to a size of the printing paper to effect the determination as to whether said position is within the effective printing area or not and a vertical effective-printing-range discriminating section which counts raster lines and compares the count value with a target value set according to the size of the printing paper to effect the determination as to whether said position is within the effective printing area or not.

4. A print control system as claimed in claim 3, which further comprises a gate means for enabling the read out data to pass therethrough or disabling them to pass therethrough depending on an output from the horizontal effective-printing-range discriminating section and an output from the vertical effective-printing-range discriminating section.

5. A print control system as claimed in claim 3, which further comprises a gate means for enabling the read out data to pass therethrough or disabling them to pass therethrough depending on an output from the horizontal effective-printing-range discriminating section and means for stopping the reading out of the data from the full-dot memory depending on an output from the vertical effective-printing-area discriminating section.

6. A print control system capable of printing data to be printed on a plurality of sizes of paper, with each of the sizes being no larger than a maximum size of printing paper, said print control system comprising:
    a full-dot memory having an area corresponding to the maximum size of the printing paper for storing print data to be printed;
    reading means for reading the print data out of said full-dot memory in a serial form in order to transmit the read out print data to a printing section;
    discriminating means for discriminating the print data read out of said full-dot memory by detecting whether or not the position of the data being printed is within an effective printing area corresponding to the size of the printing paper upon which the print data is be printed; and
    inhibiting means for inhibiting the transmission to the printing section of the read out print data which is determined to be outside of the effective printing area.

7. A print control system as claimed in claim 6, wherein said printing section effects printing by raster scanning with a beam according to the print data read out from said full-dot memory in a serial form and said discriminating means determines whether or not said position is within the effective printing area based on the a scanning position of the beam.

8. A print control system as claimed in claim 7, wherein said discriminating means comprises a horizontal effective-printing-range discriminating section which counts clocks for reading dots for each raster line and compares a resulting count value with a target value set according to a printing paper size to effect the determination as to whether or not said position is within the effective printing area and a vertical effective-printing-range discriminating section which counts raster lines and compares a resulting count value with a target value set according a printing paper size to effect the determination as to whether or not said position is within the effective printing area.

9. A print control system as claimed in claim 8, which further comprises gate means for enabling the read out print data to pass therethrough or disabling the read out print data from passing therethrough depending on an output from the horizontal effective-printing-range discriminating section and an output from the vertical effective-printing-range discriminating section.

10. A print control system as claimed in claim 8, which further comprises gate means for enabling the read out data to pass therethrough or disabling the read out print data from passing therethrough depending on an output from the horizontal effective-printing-range discriminating section and means for stopping the reading out of the data from the full-dot memory depending on an output from the vertical effective-printing-area discriminating section.

11. A print control system capable of printing data to be printed on a plurality of sizes of paper, with each of the sizes being no larger than a maximum size of printing paper, said print control system comprising:
- a full-dot memory having an area corresponding to the maximum size of the printing paper for storing print data to be printed, wherein the print data respectively correspond to various scanning positions associated with the printing of the print data;
- reading means for reading the print data out of said full-dot memory in order to transmit the read out print data to a printing section;
- discriminating means for discriminating the print data read out of said full-dot memory by determining which of the read out print data are associated with scanning positions located within an effective printing area corresponding to the size of the printing paper upon which the print data is to be printed; and
- inhibiting means for inhibiting the transmission to the printing section of the read out print data which is determined by said discriminating means to be associated with scanning positions located outside of the effective printing area.

12. A print control system according to claim 11, wherein said reading means reads the print data out of said full-dot memory in a serial form in order to transmit the read out print data to a printing section.

* * * * *